United States Patent
Reynier et al.

(10) Patent No.: US 9,896,744 B2
(45) Date of Patent: Feb. 20, 2018

(54) PROCESS FOR METALS LEACHING AND RECOVERY FROM RADIOACTIVE WASTES

(71) Applicant: Her Majesty the Queen in Right of Canada as Represented by the Minister of Natural Resources Canada, Ottawa (CA)

(72) Inventors: Nicolas Reynier, Gatineau (CA); Rolando Lastra, Ottawa (CA); Nabil Bouzoubaa, Nepean (CA); Mark Chapman, Deep River (CA)

(73) Assignee: Her Majesty the Queen in Right of Canada as Represented by the Minister of Natural Resources Canada (CA)

( * ) Notice: Subject to any disclaimer, the term of this patent is extended or adjusted under 35 U.S.C. 154(b) by 374 days.

(21) Appl. No.: 14/726,677

(22) Filed: Jun. 1, 2015

(65) Prior Publication Data

US 2016/0348214 A1    Dec. 1, 2016

(51) Int. Cl.
*C22B 60/02* (2006.01)
*G21F 9/30* (2006.01)
(Continued)

(52) U.S. Cl.
CPC .......... *C22B 60/0234* (2013.01); *C22B 7/007* (2013.01); *C22B 43/00* (2013.01);
(Continued)

(58) Field of Classification Search
CPC ....... C22B 43/00; C22B 59/00; C22B 60/023; C22B 60/0234; C22B 60/0278;
(Continued)

(56) References Cited

U.S. PATENT DOCUMENTS 2,736,634 A * 2/1956 Gaudin ............... C22B 60/0208
                                                      423/18
5,226,545 A * 7/1993 Foust ...................... A62D 3/33
                                                      423/103
(Continued)

FOREIGN PATENT DOCUMENTS

AU    2013200762 A1    8/2013
CN    101619401    *    1/2010
(Continued)

OTHER PUBLICATIONS

Gorrepati, E.A., et al., Silica Precipitation in Acidic Solutions: Mechanism, pH Effect, and Salt Effect, Langmuir, 2010, vol. 26, No. 13, pp. 10467-10474.
(Continued)

*Primary Examiner* — Colleen P Dunn
*Assistant Examiner* — Nicholas A Wang
(74) *Attorney, Agent, or Firm* — Banner & Witcoff, Ltd.

(57) ABSTRACT

Provided is a process for recovering metals from solid radioactive waste, preferably uranium, cesium, mercury, thorium, rare earths or combinations thereof. The process comprises a leaching step and a separation step. The leaching step comprises contacting the solid radioactive waste with an aqueous inorganic acid and a leaching salt to produce a mixture of a metal-rich leachate and a metal-poor waste, which are separated in the separation step. Also provided is a process for recovering metals from solid radioactive waste comprising an attrition step, a leaching step, a washing step, a combination step and a recovery step.

44 Claims, 11 Drawing Sheets

(51) Int. Cl.
*C22B 43/00* (2006.01)
*C22B 59/00* (2006.01)
*C22B 61/00* (2006.01)
*C22B 7/00* (2006.01)

(52) U.S. Cl.
CPC ............ *C22B 59/00* (2013.01); *C22B 60/023* (2013.01); *C22B 60/0265* (2013.01); *C22B 60/0278* (2013.01); *C22B 61/00* (2013.01); *G21F 9/30* (2013.01); *Y02P 10/234* (2015.11)

(58) Field of Classification Search
CPC . C22B 61/00; C22B 7/007; G21F 9/30; Y02P 10/212; Y02P 10/234
USPC .......................................................... 75/399
See application file for complete search history.

(56) References Cited

U.S. PATENT DOCUMENTS

| | | | |
|---|---|---|---|
| 6,032,881 A | | 3/2000 | Bass et al. |
| 6,468,495 B1 | | 10/2002 | Fields et al. |
| 2009/0272227 A1 | | 11/2009 | Creasey et al. |
| 2015/0307958 A1* | | 10/2015 | Wang ..................... C22B 59/00 423/21.1 |

FOREIGN PATENT DOCUMENTS

| | | | |
|---|---|---|---|
| CN | 101619401 A | | 1/2010 |
| DE | 19917936 A1 | | 10/2000 |
| JP | 2003149388 | * | 5/2003 |
| JP | 2003149388 A | | 5/2003 |
| KR | 101061480 B1 | | 9/2011 |
| KR | 101431375 B1 | | 8/2014 |
| RU | 2274915 C1 | | 4/2006 |

OTHER PUBLICATIONS

Heimbach, H., et al., 1994, Rapid Chemical Procedures for Radioanalytical Waste Control (Law and Maw), United States.

Kaufman, David, and George W. Lower. A summary report on the ion exchange process for the recovery of uranium. No. ACCO-68. American Cyanamid Co. Atomic Energy Div. Raw Materials Development Lab., Winchester, Mass., 1954.

Mikhaylenko, M. and van Deventer, J. 2009. "Notes of Practical Application of Ion Exchange Resin in Uranium Extractive Metallurgy". In ALTA 2009 Uranium Conference, Melbourne : ALTA Metallurgical Services.

* cited by examiner

PROCESS FOR METALS LEACHING AND RECOVERY FROM RADIOACTIVE WASTES

FIELD OF THE INVENTION

The present invention generally relates to radioactive wastes and more particularly to a method of leaching and recovery. More specifically, this invention relates to a process for metals leaching and recovery from solid radioactive wastes.

BACKGROUND OF THE INVENTION

In Canada, radioactive wastes are produced since the early '30s, when the first uranium mine began operating at Port Radium in the Northwest Territories. Canada is now the first world producer of uranium (26% of world production), 90% of its production is exported and today there are 20 mines and facilities closed or decommissioned (14 in Ontario, 4 in Saskatchewan and 2 in the Northwest Territories). Radioactive wastes are grouped into three categories: nuclear waste, low and medium activity radioactive waste and waste from the extraction and concentration of uranium and rare earths (Low-Level Radioactive Waste Management Office, 2012). The wastes inventory at the end of 2010 reached 214 million tons from uranium processing and 174 million tonnes of mine wastes. Radioactive wastes generated by uranium processing and mine wastes (uranium and rare earth) require very specific decontamination processes. Atomic Energy of Canada Limited (AECL) is developing a long-term disposal strategy for existing cemented radioactive wastes, which contains significant amounts of uranium, mercury, and a large number of minor elements, including rare earths and fission products. An earlier study indicated that extracting the uranium would be advantageous for decreasing the long-term radioactivity of the waste and, consequently, the cost of the long-term disposal process. Consequently, there are safety and economic incentives for the extraction of metals before subjecting Solid Radioactive Cemented Wastes (SRCW) to a stabilization process. Radioactive elements of uranium and thorium are usually associated with rare earth deposits. The separation of uranium and thorium from rare earths is often a big concern in rare earth industry in order to manage the radioactive nuclides (Zhu et al., 2015). Conversely, uranium ores often contain significant concentration of rare earth. Due to recent increases in both uranium and rare earth prices, there is renewed interest in uranium and rare earth mine sites for developing new ore bodies as well as re-processing the historic waste rock piles and tailings impoundments. Reprocessing Solid Radioactive Mine Wastes (SRMW) may present significant financial and environmental benefits.

The technology for recovering uranium from its most common ores is well established and a vast amount of information is available in the technical literature (Merritt, 1971; Wilkinson, 1962). Uranium is normally leached from its ores with sulfuric acid, separated from impurities using solvent extraction or ion exchange, and precipitated with magnesium or ammonium hydroxide to yield a commercial product, known as "yellow cake". Extraction of rare earth is also well established. The extractive metallurgy of rare earth from monazite sand, bastnasite ore, and phosphate rock of igneous origin was described by Habashi (2013). This includes mineral beneficiation, leaching methods, fractional crystallisation, ion exchange, solvent extraction, precipitation from solution, and reduction to metals. By contrast, cemented radioactive wastes (SRCW) differ significantly from common ores. SRCW have a unique mineralogy, a high nature, a relatively low U grade, and a high content of Ca (~35%), $SiO_2$ (~20%) and Hg (~1,500 ppm). The chemical composition of mining radioactive wastes (SRMW) could also differ significantly from ores. Some tailings samples are composed of quartz, illite, gypsum, pyrite, microcline, calcite and muscovite. Others are mainly composed of gypsum, quartz, nimite, albite and illite. The composition of the solid radioactive wastes poses significant impediments to the extraction and recovery of metals using conventional technologies. The high Ca content will interfere with both carbonate leaching and sulfuric acid leaching by forming large amounts of $CaCO_3$ and $CaSO_4$, respectively. Furthermore, the high silica content of the cemented radioactive wastes may lead to the formation of colloidal silica, which is known to create severe problems in hydrometallurgical circuits (Queneau and Berthold, 1986). Ion exchange was considered the best method to separate the uranium or rare earth in the leach solution from the impurities and to produce a purified and concentrated solution suitable for yielding a uranium or rare earth products. Most likely, solvent extraction technology cannot be used because of the high concentrations of Al, Fe and colloidal silica, which may cause severe phase separation problems (Queneau and Berthold, 1986; Ritcey and Wong, 1985). The adsorbed uranium and rare earth are usually eluted from the resin with dilute acid or alkaline solutions and subsequently precipitated. The presence of sodium chloride in uranium and rare earth sulfuric leachate is a major problem for nuclear and mining industries. Several researches were done to improve selectivity of resins for metals especially in sodium chloride media.

There is a wide variety of disadvantages and challenges related to the known techniques for treating solid radioactive wastes and metals recovery from radioactive cemented and mine wastes. Main disadvantages are process efficiency and cost-effectiveness. There is indeed a need for a technology that overcomes at least some of the disadvantages of the known methods in the field.

SUMMARY OF THE INVENTION

The present invention responds to the above need by providing a process for metals leaching and recovery from solid radioactive wastes. Accordingly, the invention provides a process for remediation of radioactive wastes comprising metals, which include uranium and/or cesium and/or mercury and/or thorium and/or rare earth, and for recovery of these from radioactive wastes.

Certain exemplary embodiments provide a process for recovering metals from solid radioactive waste comprising the metals, the process comprising:
  a) a leaching step comprising contacting the solid radioactive waste with an aqueous inorganic acid at a concentration between about 0.1 M and about 2 M, and a leaching salt, at a temperature lower than about 100° C., to solubilize at least a portion of the metals present in the solid radioactive waste, thereby producing a mixture of a metal-rich leachate and a metal-poor waste; and
  b) a separation step comprising separating the metal-rich leachate from the metal-poor waste.

Other exemplary embodiments provide a process for recovering metals from solid radioactive waste comprising the metals, wherein the metals comprise uranium, cesium, mercury, thorium, rare earth or combination thereof; the process comprising:

a) an attrition step comprising mixing the solid radioactive waste with water to solubilize at least a portion of the metals present in the waste providing an aqueous mixture; and separating the aqueous mixture to provide a metal-rich liquid, a metal-depleted waste and a metal-rich sludge;

b) a leaching step comprising contacting the metal-rich sludge from step a) with an aqueous inorganic acid at a concentration between about 0.1 M and about 2 M, and a leaching salt, at a temperature lower than about 100° C., to solubilize at least a portion of the metals present in the solid radioactive waste, thereby producing a mixture of a metal-rich leachate and a metal-poor waste; and separating the metal-rich leachate and metal-poor waste;

c) a washing step comprising contacting the metal-poor waste from step b) with an aqueous solution, at a temperature lower than about 100° C., solubilize a substantial amount of the metals to produce a metal-rich solution and metal-poor waste, and separating the metal-rich solution and metal-poor waste;

d) a combination step comprising combining the metal-rich liquid of step a), the metal-rich leachate of step b) and the metal-rich solution of step c) to provide a metal-rich combined solution;

e) a recovery step comprising contacting the metal-rich combined solution with an ion exchange resin favoring the metals extraction; or contacting the metal-rich combined solution with a coagulant at a pH favoring precipitation of the metals.

Additional embodiments, aspects and features of the invention will be described and defined herein.

DETAILED DESCRIPTION OF THE PREFERRED EMBODIMENTS

Figure 1:
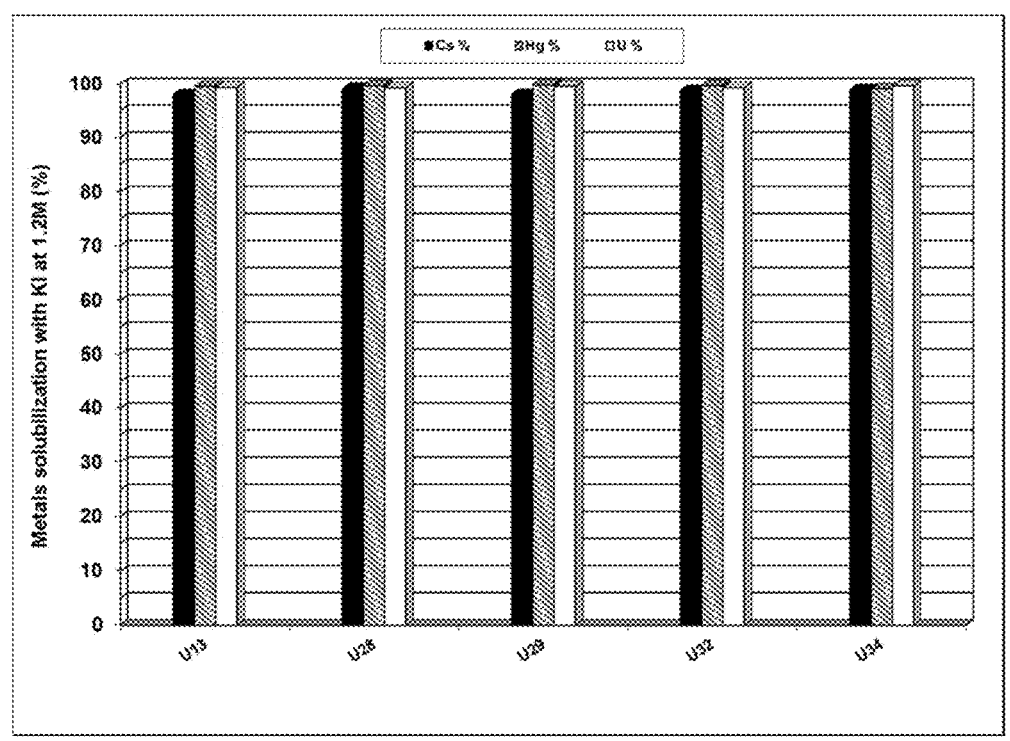
FIG. 1 is a diagram showing the Cs, Hg, and U solubilisation yields from SRCW using sulfuric acid and potassium iodide.

Process embodiments of the present invention provide an effective and economical technique to remove metals from solid radioactive wastes and to treat the resulting leachate solutions. In one optional aspect of the process embodiments of the present invention, they are used in relation to wastes containing uranium, cesium, mercury, thorium, and rare earth.

Definitions

"About", when qualifying the value of a variable or property—such as concentration, temperature, pH, particle size and so on—means that such variable or property can vary within a certain range depending on the margin of error of the method or apparatus used to evaluate such variable or property. For instance, the margin of error for temperature may range between ±1° C. to ±5° C.

"Radioactive waste" means a radioactive waste that may be in any state, liquid, solid, granular, or powder form and so on. It should be understood that the radioactive waste might be mixed with a non-radioactive waste at various point in the process in order to form an overall waste quantity to meet certain governmental or environmental standards.

"Radioactive cemented waste" means a radioactive waste, which has at some time been in contact with a cement to thereby become "cemented". "Radioactive mine waste" means a radioactive waste, which was produced during mining operations or related to mining activities. It should be understood that the radioactive cemented or mine waste might be mixed with a non-radioactive waste at various point in the process in order to form an overall waste to meet certain governmental or environmental standards.

"Metals" means the elements of interest which are included in the radioactive wastes and for which there are safety and economic incentives for their extraction. Metals may include uranium, cesium, mercury, rare earth, a combination thereof and/or other metal species.

"Inorganic acid" means an acid lacking a carbon atom and may be a sulfuric acid nitric acid, hydrochloric acid, mixtures thereof, or a combination of acids and corresponding salts. It should also be understood that the inorganic acid may be a used or recycled acid.

"Attrition", when pertaining to the solid waste and water, means subjecting a mixture of solid waste and water to agitation to induce physical wear of the waste and separation into smaller waste particles. Attrition may also aid in desorbing fine waste particles from larger waste particles. The attrition may help enable diffusion of the metals from the waste fractions and/or fine waste particles into the aqueous solution. The attrition may include techniques such as milling. An attrition step may be performed in conjunction with other actions, such as contacting the waste with water, and the contacting step may include soaking, batch mixing, trickling, spraying, continuous flow-by, or various combinations of such contacting techniques.

"Contacting", when pertaining to the solid radioactive waste and the aqueous inorganic acid, means that those elements contact each other so as to enable diffusion of the metals from the waste phase into the acid solution phase. The "contacting" will often be referred to as leaching herein and may include techniques such as soaking, batch mixing, trickling, spraying, continuous flow-by, or various combination of such contacting techniques.

"Separating", when pertaining to the metals-rich solution and the metals-poor waste, means any suitable solid-liquid separation technique.

"Uranium" (U), "cesium" (Cs), "mercury" (Hg), "thorium" (Th), unless specified otherwise, each means a compound containing the given element and may include solubilized ions, complexes, derivatives, isomers, as the case may be. For instance, the term "uranium" may include uranium (IV) and uranium (VI); "cesium" may include cesium in association with other elements or solubilized in an aqueous medium; while "mercury" may include the element in association with sulfur or oxygen, solubilized, or in its pure metallic form upon recovery. Thus, these elements should be read with a mind to their relationship with the process steps, process conditions and other interacting compounds.

"Rare Earth" (REE) means a compound containing at least one element of the rare earth elements (Scandium, Yttrium, Lanthanum, Cerium, Praseodymium, Neodymium, Promethium, Samarium, Europium, Gadolinium, Terbium, Dysprosium, Holmium, Erbium, Thulium, Ytterbium, Lutetium) and may include solubilized ions, complexes, derivatives, isomers, as the case may be. For instance, the term "Rare Earth" may include one of the light rare earth ($La_2O_3$ $CeO_2$ $Pr_6O_{11}$ $Nd_2O_3$) and/or one of the heavy rare earth ($Sm_2O_3$ $Eu_2O_3$ $Gd_2O_3$ $Tb_4O_7$ $Dy_2O_3$ $Ho_2O_3$ $Er_2O_3$ $Tm_2O_3$ $Yb_2O_3$ $Lu_2O_3$ $Y_2O_3$) in association with other elements or solubilized in an aqueous medium. Thus, these elements should be read with a mind to their relationship with the process steps, process conditions and other interacting compounds.

"Metals-rich solution" means a solution containing the metals removed from the solid radioactive waste during a leaching step. It should also be understood that for subsequent treatment of the solution to remove or recover metals, the metals-rich solution from the initial step may be combined with solutions from other leaching or washing steps to form an overall metals-rich solution. Thus, the metals-rich solution may be combined with other streams, or be subjected to various other steps before it is treated to recover one or more of the metals.

Embodiments of the Process

A process for recovering metals from solid radioactive wastes, including cemented radioactive wastes and mine radioactive wastes, has been developed. In one aspect, the process includes at least one leaching step of the solid radioactive waste to solubilize metals. Preferred metals can include uranium, cesium, mercury, thorium and rare earths, or any combination thereof. Optionally, the solid radioactive waste can be crushed or screened or any know methods to reduce the particle size of the waste. For example, it can be reduce to a particle size inferior to about 1 cm, preferably inferior to about 2 mm.

The at least one leaching step is performed with an aqueous inorganic acid solution, and may be performed with an additional leaching salt. The aqueous inorganic acid is preferably in a concentration from about 0.1 M to about 2 M. The inorganic acid may be sulfuric acid, nitric acid, hydrochloric acid, phosphoric acid, or any mixtures thereof, or may also be a combination or inorganic acid and corresponding salts. The inorganic acid may be used acid or recycled acid. Preferably, the inorganic acid is sulfuric acid.

The leaching salt may be a halogen salt, such as iodine, chlorine, fluorine or bromine, or any combination thereof. Preferably, the leaching salt is an iodine salt, such as potassium iodide, sodium iodide or the like, or any combination thereof. Most preferably, the leaching salt is potassium iodide. The salt may be in a concentration between about 0.012 M and about 1.2 M. The solid radioactive waste to be treated by the process may have a content from about 50 g/L to about 500 g/L of the total mixture of the leaching step.

The at least one leaching step is preferably carried out at a temperature lower than about 100° C. to solubilize at least a portion of the metals present in the solid radioactive wastes, preferably between about 20° C. and about 80° C. Optionally, the leaching step may further comprise any form of mixing to aid the solubilization. Mixing may be carried out for a period sufficient to solubilize the metals, for example from about 0.5 h to about 24 h. A metal-rich leachate and a metal-poor waste are formed from the leaching step.

In another embodiment, multiple leaching steps may be carried out, for example in a sequential manner. Each leaching step may independently comprises the same or different conditions, namely the inorganic acid and its concentration, the leaching salt and its concentration, the temperature, the optional mixing and mixing time. The multiple leaching steps may be performed in batch, semi-continuously or continuously in tank reactors, or any known methods in the art.

In another aspect, the process further includes a separation step for separating the metal-rich leachate and a metal-poor waste. For example, the separation step may comprise decantation, filtration, centrifugation, solid-liquid separation or any suitable known techniques, or any combination thereof.

The present process may further comprise at least one treatment step for the recovery of metals from the metal-rich leachate. This recovery step may be carried out using any known methods in the art for recovering the desired metal, preferably uranium, cesium, mercury, thorium, rare earths, any combination thereof, and may be recovered in the form of a mixed metalloid or as a pure metal. For example, the recovery step may comprise chemical precipitation, ion exchange, solvent extraction or adsorption, or any combination thereof. Preferably, the metals are recovery by ion exchange or by a coagulant favoring the precipitation of the metals at a given pH. Preferably, at least two metals are recovered from the metal-rich leachate, most preferably all metals are simultaneously recovered. It has been shown that the removal yields may be increased when using the leaching salt rather than when only the inorganic acid is used, as will be exemplified in the below examples, tables and figures.

In a further embodiment, the metal-poor waste obtained from the separation step may be washed to potentially remove any residual metals, by at least one washing step, optionally multiple washing steps. This washing step may comprise filtering the separated metal-poor waste to provide solids, rinsing or mixing the solids with a washing solution and separating the washed solids and the spent washing waters. The washing solution may comprise water, a dilute acid solution, or an acid solution. When proceeding with multiple washing steps, the conditions as previously defined may be independently selected. The spent washing waters may contain residual metals and may be combined with any previous fraction or treated directly by any steps as defined above for recovering the metals. For example, it may be recycled into a further leaching step or directly undergo a recovery step as previously defined.

In another aspect, the process may include, before the at least one leaching step, at least one attrition step where the solid waste is mixed with water and subjected to attrition so as to solubilize metals from the solid waste into water.

According to one embodiment of the process, the attrition step includes mixing the waste with water. The attrition step further includes agitating the aqueous mixture of waste for a period sufficient to adequately solubilize metals present in the waste and form an aqueous suspension of waste including waste fractions and fine waste particles. Optionally, the agitation duration may be between about 0.01 h and about 1 h. The attrition step may therefore be performed to solubilise in water at least a portion of metals present in the initial solid waste.

Optionally, the amount of water and/or the amount of solid waste that are mixed together during the attrition step may be adjusted to obtain an aqueous mixture of waste having a waste concentration between about 50 g/L and about 500 g/L of solution.

According to another embodiment of the process, at least one attrition step may be a single attrition step or include several sequential attrition steps. Optionally, the attrition step(s) may be operated in batch, semi-continuous or continuous mode in tank reactors.

In another aspect, prior to the at least one attrition step, the process may include crushing or screening of the solid waste as defined above.

In another aspect, subsequent to the at least one attrition step and before the at least one leaching step, the process may include a first separation step to separate the aqueous suspension of waste into a metal-rich liquid, a metal-rich sludge (also referred to as attrition sludge) and a metal-depleted waste. Optionally, the separation step may include decantation, filtration, centrifugation, or another standard technique of solid-liquid separation known in the art.

It should be understood that the waste which is subjected to the leaching step may be a solid waste as defined above, the metal-depleted waste as defined above if the process includes an attrition step prior to the leaching step, or a combination thereof.

In another aspect, the process may further include combining the metal-rich liquid from the attrition step, the metal-rich leachate from the leaching step and the spent washing liquids from the washing step to obtain a solution containing a major portion, or close to the totality of the targeted metals. Optionally, some or all of the washing liquids may also be directly used as process water for the operation of the initial leaching step for a subsequent batch of solid waste to be treated according to the present process.

In another aspect, the process may also include treating the metal-rich solution, the metal-rich acid leachate, the spent washing liquids or a combination thereof, to recover at least one of the metals. The combination of the metal-rich solution, the metal-rich acid leachate and the spent washing liquids will be generally referred to herein as the "metal solution", which contains the solubilized metals. It should be understood however that the solution treated to recover solubilized metals may be the metal-rich solution or the acid leachate or the spent washing liquid only.

Optionally, the recovery step may include one or a combination of known techniques as defined above. After the metal solution has been treated to remove the metals, it may for example be used as process water for the operation of the leaching step. Optionally, the leaching residue and the metals extracted from the waste can be safely disposed or recycled.

In one aspect, a process for recovering metals from solid radioactive waste is provided, comprising an attrition step as defined above, a leaching step as defined above, a washing step as defined above, a combination step comprising combining the metal-rich liquid from the attrition step, the metal-rich leachate from the leaching step and the metal-rich solution from the washing step, and further comprises a recovery step as previously defined to recover at least one of uranium, cesium, mercury, thorium or rare earths.

Embodiments of the present invention provide a number of advantages. Advantages will be understood as per the above and the examples and experimental data obtained through the extensive studies presented below. For instance, the use of inorganic acid and leaching salt, such as sulfuric acid and potassium iodide respectively allows very efficient uranium, cesium, mercury, thorium, and/or rare earth solubilisation from waste at a low chemical cost. Furthermore, the addition of at least one washing step after the leaching step is useful to remove the dissolved metals still present in the waste. Selective separation and purification of metals by ion exchange allows to safely disposing or recycling the metals. Finally, extracting the metals would be advantageous for decreasing the radioactivity of solid radioactive waste and, consequently, the cost of long-term disposal.

EXAMPLES, EXPERIMENTATION & ADDITIONAL INFORMATION

The embodiments of the present invention will be further comprehended and elaborated in light of the following examples and results, which are to be understood as exemplary and non-limiting to what has actually been invented.

General Methodology

The following describes the general methodology of examples of an embodiment of the process of the present invention.

Radioactive Cemented Wastes

All the experiments were carried out with solid radioactive cemented wastes (SRCW) prepared at CanmetMINING. The procedure involves mixing a synthetic solution with either General Use (GU) or High Early Strength (HE) cements manufactured by Lafarge Canada Inc., in a manner that mimics the process carried out at AECL. The solid wastes batches were allowed to age and were subsequently removed from the pails with an air hammer. The whole pail content (~20 kg) was crushed in a laboratory jaw crusher (Retsch, model BB200) to about 2 mm and then split into 12 fractions of about 1.7 kg each, using a large capacity (20 kg) rotary splitter (GENEQ, model SEO4OJ-001). One of the 12 fractions was further ground in a disc mill (Retsch, model DM200) to less than 300 μm and split into ten fractions of about 170 g, using a medium capacity rotary splitter (Fritsch Rotary Cone Sample Divider, Model Laborette 27), then re-sampled at either 100 g or 50 g.

Table 1 shows the experimental conditions used to prepare various SRCW batches and their partial compositions.

TABLE 1

Main experimental parameters used to prepare solid wastes batches and partial composition

| Batch Code | Cement Type | S/C* Ratio | Aging Time | Aging Temperature | Cs ppm | Hg ppm | U ppm |
|---|---|---|---|---|---|---|---|
| U13 | GU | 0.29 | 18 months | 60° C. | 3.5 | 1,116 | 893 |
| U28 | GU | 0.39 | 18 months | 60° C. | 8.5 | 1,973 | 1,150 |
| U29 | GU | 0.29 | 18 months | Ambient | 7.2 | 1,977 | 1,104 |
| U32 | GU | 0.29 | 18 months | 60° C. | 6.0 | 1,277 | 850 |
| U34 | HE | 0.39 | 18 months | Ambient | 8.0 | 2,651 | 1,355 |

*Solution to Cement ratio

Radioactive Mine Wastes

Experiments on solid radioactive mine wastes (SRMW) were conducted using submerged tailings collected from the two uranium mines and using an ore concentrate of rare earth. The rare earth ore concentrate was used as received. A field campaign was conducted in June 2012 at the Denison mine (Elliot Lake, Ontario). Various cores and four bulk samples were taken at the Denison tailings management area. The following summer, other samples were taken at the Gunnar mine site (Saskatchewan) at the Langley Bay. Once received, the samples were stored at 4° C. and remained saturated with water to prevent oxidation.

Table 2 shows the elements concentration in submerged tailings from uranium mines and the ore concentrate of rare earth. Mineralogy of these samples indicated that Quest and Denison samples are mainly made of Quartz, K-feldspar and pyroxene minerals. Gypsum phases are mainly present in the Gunnar sample.

filtrated on Whatman 934AH membranes for further soluble metals analysis. Uranium precipitation from the ion exchange resin eluate was done using ammonium hydroxide solution (28%), magnesium or sodium hydroxide.

Analytical

The liquid samples were analyzed by ICP-MS (Thermo-Fisher Scientific, X-Series II), after appropriate dilution with HCl to stabilize the Hg(II). Solid samples were digested in HCl before being analyzed by ICP-MS. The mineralogical characterization of the cemented material and leach residues

TABLE 2

Elements concentration in tailings from uranium mines and the ore concentrate of rare earth

| | Elements (mg/kg) | | | | | | | | | | | | | | | | |
|---|---|---|---|---|---|---|---|---|---|---|---|---|---|---|---|---|---|
| | Th | U | Y | La | Ce | Pr | Nd | Sm | Eu | Gd | Tb | Dy | Ho | Er | Tm | Yb | Lu |
| Quest | 585 | 109 | 4816 | 1383 | 3427 | 388 | 1262 | 340 | 22 | 397 | 100 | 743 | 182 | 615 | 90 | 537 | 74 |
| Denison | 213 | 65 | 32 | 472 | 854 | 85 | 272 | 42 | 2 | 31 | 3 | 9 | 1 | 2 | 0 | 2 | 0 |
| Gunnar | 39 | 40 | 32 | 86 | 165 | 18 | 59 | 10 | 1 | 9 | 1 | 6 | 1 | 3 | 0 | 3 | 0 |

Leaching Experiments

The screening leaching tests were done by mixing 50 g of SRCW or SRMW with a known volume of a selected lixiviant in a 1-L glass Erlenmeyer flask, which was agitated in a temperature-controlled orbital shaker (Labnet, Model 211DS). The optimization and validation leaching tests were performed in a 2-L beaker. Leaching steps were done by mixing 50 g of waste with 500 mL of solution for a pulp density (PD) of 10% v/w. Agitation was performed using an immersed axial impeller or by magnetic stirring set at 300 rpm. The solution was then filtered onto Whatman™ No. 4 cellulose paper (porosity=20-25 μm). The residue and filter were then dried at room temperature.

Metals Recovery

Experiments regarding ion exchange resin and adsorbent assessed the potential of ion exchange for selective recovery of metals. Experiments were done in batch and continuous mode (on column). One gram of resin was mixed with 100 mL of leachate in 500 mL Erlenmeyer flasks and shake at 200 revolutions per minute (rpm) (Orbital shaker, Lab-line Environ-Shaker, model 3528) for 24 h to ensure that chemical equilibrium was attained. Thereafter, liquid to solid separation was made by filtration onto Whatman 934AH filter. Cesium and mercury were removed selectively by using potassium cobalt hexacyanoferrate (KCFC) and resin Lewatit™ TP214 respectively. For uranium, the ion exchange resins studied were Reillex™ HPQ, Dowex™ 21K-XLT, Lewatit MP500, Lewatit TP207, Dowex M4195, Lewatit TP260, and Lewatit K7367. The column experiments were done using an Omnifit™ column with a bed volume of 12 mL. Leachate was passed through the resin using a peristaltic pump (Masterflex™) at a flow rate of 3 BV/h. An automatic fraction collector (Eldex Laboratories) was used to take samples of the column effluent. Uranium was then eluted form the resin with 1M $Na_2CO_3$, 1M $NH_4NO_3$, 6M NaOH, or 2M $HNO_3$ solutions and subsequently precipitated using sodium hydroxide, hydrogen peroxide solution (30%), ammonium hydroxide solution (28%) or magnesium hydroxide.

Chemical Precipitation

Experiments occurred in 250 mL beaker with magnetic stirring at 250 rpm using a Teflon™-covered bar. Solution pH was initially stabilized to the appropriate pH by adding alkaline or acid solution. The supernatant was collected and was done using a combination of X-Ray Diffraction (XRD) (Rigaku, model D/Max), Scanning Electron Microscopy (SEM) (JEOL, model JSM 820) and Variable-Pressure Scanning Electron Microscopy (VP-SEM) (Hitachi, model S-3200N) both with Energy Dispersive X-Ray Analyzer (EDS).

EXAMPLE 1

Uranium, Mercury, and Cesium Leaching from SRCW

Without being bound by theory, the concentrated sulphuric acid can act both as an acid and as an oxidising agent. The concentrated sulphuric acid gives a hydrogen ion to the halide ion to produce a hydrogen halide. As an example, concentrated sulphuric acid reacts with sodium chloride to produce hydrogen chloride and sodium hydrogensulphate. All of the halide ions (fluoride, chloride, bromide and iodide) behave similarly. Fluoride and chloride ions will not reduce concentrated sulphuric acid. Iodide ions are stronger reducing agents and are oxidised to iodine by the concentrated sulphuric acid. Sodium chloride formed mercury complex ($HgCl_4^{2-}$, $K_f=5.10^{15}$) when Hg is present as mercury oxide HgO or metallic mercury $Hg^0$ in 30 months aged SRCW but not with mercury sulfide HgS (pK=52) formed in 60° C. cured SRCW. In order to oxidize $Hg^0$, as well as HgS, tests were performed using iodide halogen salt as strong oxidant to form Hg complex ($HgI_4^{2-}$, $K_f=2.10^{30}$). As background, it can be mentioned that a patented process was developed (Fousts, 1993) for soil remediation by removing mercury using a treatment with an oxidant, such as iodide, and a complexing or solubilising agent, such as potassium iodide. In addition, Klasson et Koran (1997) studied the removal of Hg from solids using a potassium iodide/iodine leaching process.

Various SRCW cured at 60° C. and/or aged during 30 months were subjected to leaching using sulfuric acid and potassium iodide. These SRCW were U13 (18 months at 60° C.), U28 (30 months at 60° C.), U29 (30 months at ambient temperature), U32 (30 months at 60° C.), and U34 (30 months ambient temperature). A 50 g sample of SRCW crushed at 0.3 mm was mixed with 500 mL of distilled water to obtain a 10% pulp density. Potassium iodide was also added to obtain a concentration of about 1.2M. Then pure sulfuric acid was added to obtain a concentration of about 1M. Agitation using an immersed impeller during 2 hours at ambient temperature was performed.

FIG. 1 presents the solubilisation of Cs, Hg, and U from five mentioned SRCW using sulfuric acid and potassium iodide: U13 (18 months at 60° C.), U28 (30 months at 60° C.), U29 (30 months at ambient temperature), U32 (30 months at 60° C.), and U34 (30 months ambient temperature) (particle size=0.3 mm, t=120 min, $H_2SO_4$=1M, PD=10%, T=20° C., KI=1.2M). Initial concentration of Cs, Hg, and U in each SRCW are given in Table 1. For all the tested SRCW batches, solubilisation yields are above 97% for Cs and 98% for U and Hg. Sulfuric acid and potassium iodide improve the solubilisation of Hg by oxidation of all the mercury species and form mercury tetraiodide complex ($HgI_4^{2-}$, $K_f$=2.10$^{30}$).

EXAMPLE 2

Influence of Iodide Concentration and Particle Size

Figure 2:
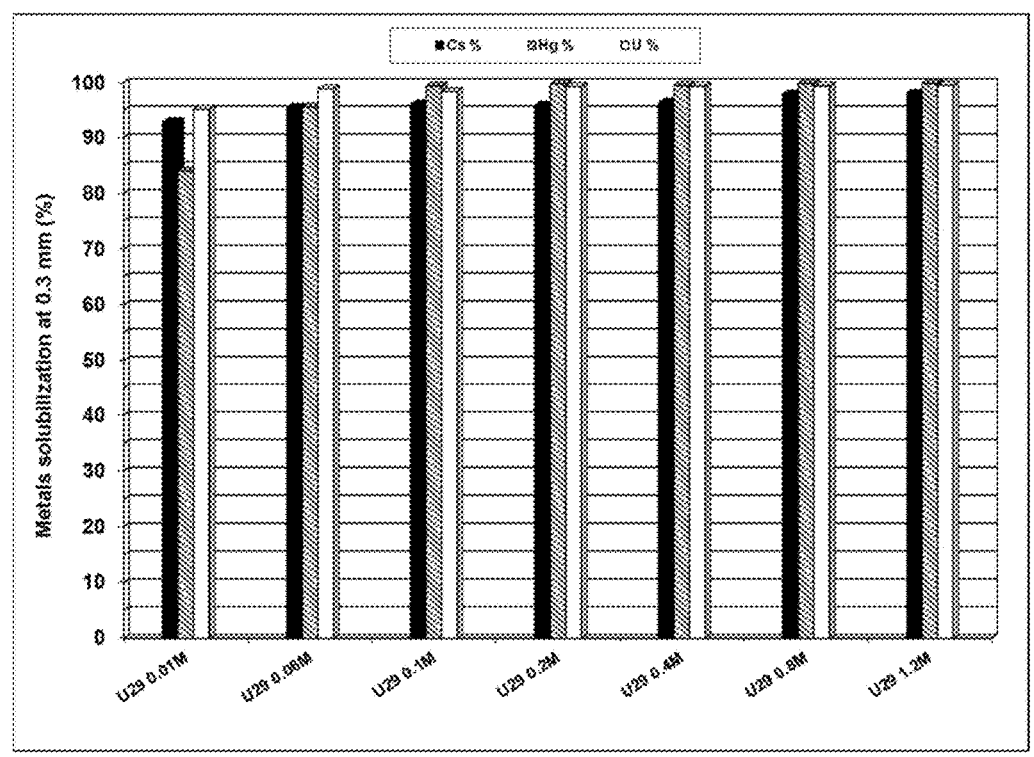
FIG. 2 is a diagram showing the Cs, Hg, and U solubilisation yields from SRCW at different iodide concentration.
Figure 3:
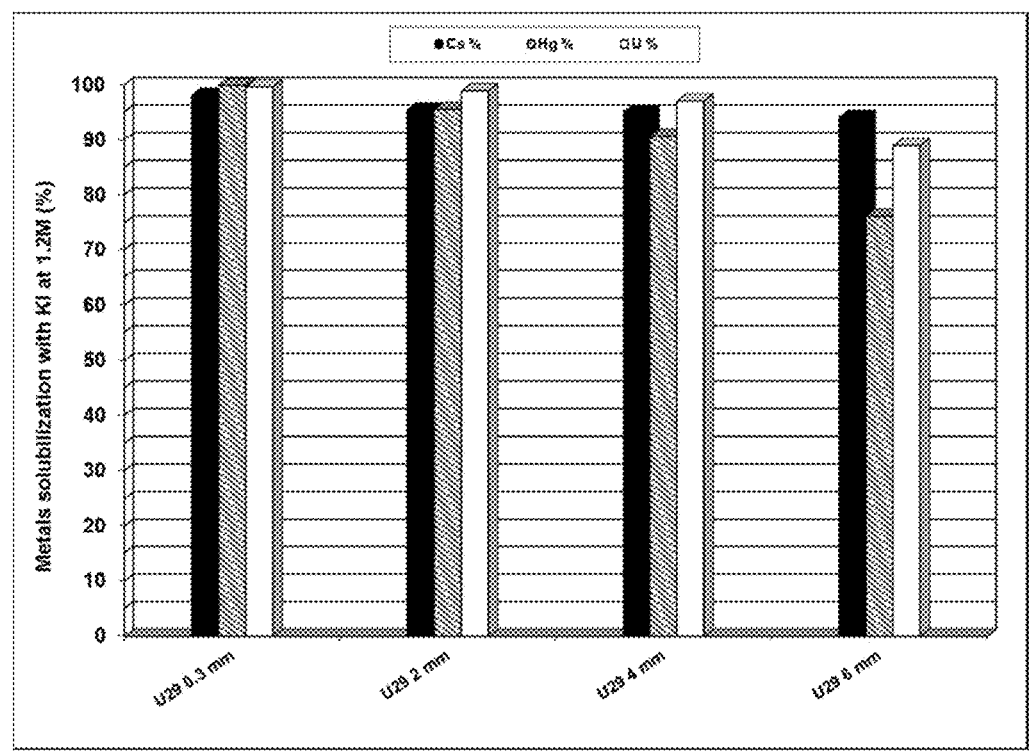
FIG. 3 is a diagram showing the Cs, Hg, and U solubilisation yields from SRCW at different cement particle size.

Optimization tests were done to evaluate the influence of potassium iodide concentration and SRCW particle size on the solubilisation efficiencies. The optimization experiments were done in a 2-L beaker by mixing 50 g of U29 SRCW with 500 mL of solution for a pulp density of 10% v/w. Leaching of U29 cemented waste was performed using different concentration of KI from 0.01M to 1.2M. FIGS. 2 and 3 present the influence of the iodide concentration on Cs, Hg, and U solubilisation. In FIG. 2, Cs, Hg, and U solubilisation yields from U29 cemented waste are shown, using sulfuric acid and various concentrations of potassium iodide. Initial concentrations are about 7.2 ppm for Cs, 1 977 ppm for Hg, and 1 104 ppm for U (particle size=0.3 mm, t=120 min, $H_2SO_4$=1M, PD=10%, T=20° C.). FIG. 2 shows no decrease of solubilisation yields for potassium iodide concentration from 1.2M to 0.2M. At 0.1 M and lower concentration of KI, the process efficiency decreases slightly especially for Hg. This result indicates the importance of potassium iodide to oxidize the mercury species in the SRCW. Potassium iodide is effective even at low concentrations of 0.1M, whereas a high concentration of sodium chloride of 4M is needed to achieve good Hg solubilisation.

Another set of experiments were done using a particle size from 0.3 mm to 6 mm. FIG. 3 presents the influence the cement particle size on Cs, Hg, and U solubilisation. Cs, Hg, and U solubilisation yields from U29 cemented waste are shown, using sulfuric acid and potassium iodide. Initial concentrations are about 7.2 ppm for Cs, 1 977 ppm for Hg, and 1 104 ppm for U (t=120 min, $H_2SO_4$=1M, PD=10%, T=20° C., KI=1.2M). FIG. 3 shows that the particle size of the cemented waste has an important influence on the solubilisation efficiency. The increase of the particle size decreases the solubilisation efficiency. For example, mercury solubilisation decreases form 99% to 95% and then to 90% when particle size increases from 0.3 mm to 2 mm and then to 4 mm. These results may be explained by the mineralogy of the cemented waste. Uranium phases were found mainly as long layers (400 µm) and some small grains. Mercury phases were found as grains below 20 µm and the small grains that tend to agglomerate with longer aging times and higher aging temperatures. Moreover, the proportion of metallic mercury and mercury sulfide appears to increase with aging times and aging temperatures.

EXAMPLE 3

Cesium and Mercury Selective Recovery

Figure 4:
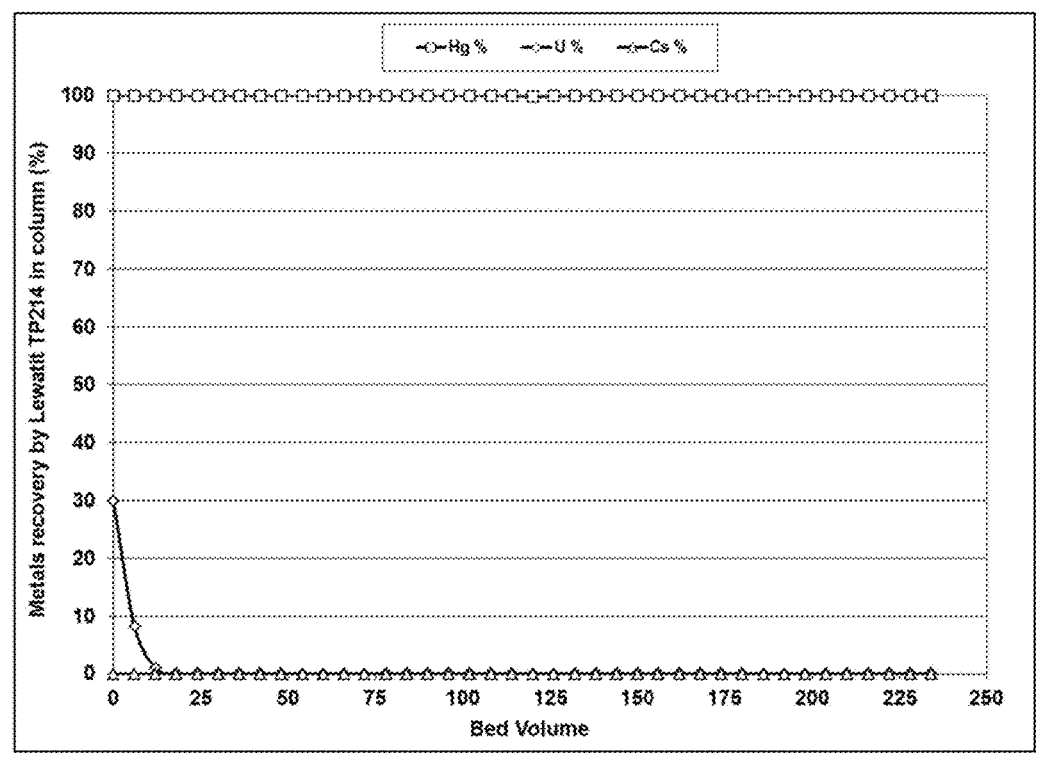
FIG. 4 is a diagram showing the Hg recovery from metals-rich solution of sulfuric acid and potassium iodide.

Cesium and mercury were removed selectively from the leachate by using Potassium Cobalt Hexacyanoferrate (KCFC) and Lewatit TP214 respectively. Column experiments were done to further test the selectivity of the Hg and Cs absorbents and evaluate their capacity. The leachate with ~100 ppm of Hg was passed through a 12 mL Omnifit column filled with Lewatit TP214 resin at 3 bed volumes per hour (BV/h). FIG. 4 presents the mercury uptake by the resin, which illustrates the Hg recovery from cemented waste leaching using sulfuric acid and potassium iodide.

Mercury was selectively removed from the leachate as no cesium and uranium were retained by the resin. Other experiments indicated that Hg(II) was partially adsorbed in the absence of chloride or iodide ions and strongly adsorbed in the presence of even trace amounts of chloride or iodide ions. A mercury loading in the resin of 5% was achieved and could reached 50% according to literature.

Figure 5:
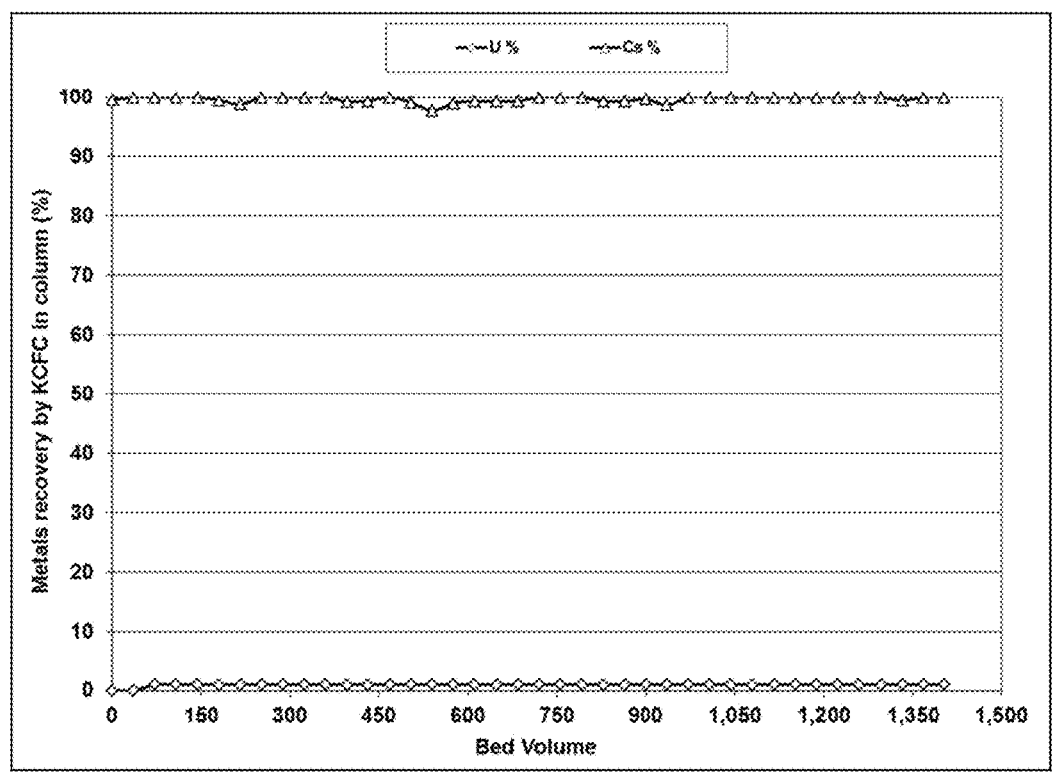
FIG. 5 is a diagram showing the Cs recovery from metals-rich solution of sulfuric acid and potassium iodide.

FIG. 5 shows the cesium uptake by passing the same leachate with ~0.8 ppm Cs through a small glass column (1 mL) filled with KCFC at a 3 BV/h flowrate. FIG. 5 indicates a selective recovery of cesium from the leachate. For the mercury loading, the breakthrough was not achieved due to the high capacity of the ion exchange resin used. Similarly, the cesium breakthrough was not achieved due to the high capacity of the KCFC.

After the cesium and mercury recovery, no change in uranium concentration was observed. Cesium removal could be done as a final step treatment as cesium does not interfere with uranium recovery. However, the Hg loading reduces to some extent the resin capacity for U. Therefore, the removal of Hg must be preferably prior to the removal of U.

EXAMPLE 4

Uranium Selective Recovery

The presence of sodium chloride in sulfuric leachate is a major problem for nuclear and mining industries. Several investigations were done to improve the selectivity of resins especially in sodium chloride media. In case of U recovery from sulfuric acid leachate containing potassium iodide, no studies exist in the literature. Zhang et al. (2012) have investigated the recovery of gold from iodine-iodide solutions using an anion exchange resin. The gold iodide complex can be effectively loaded on the resin provided the resin is not heavily loaded with triiodide. Sodium chloride solution containing sulfite was found to be highly effective for the elution of both gold and iodine (Zhang et al. 2012).

Figure 6:
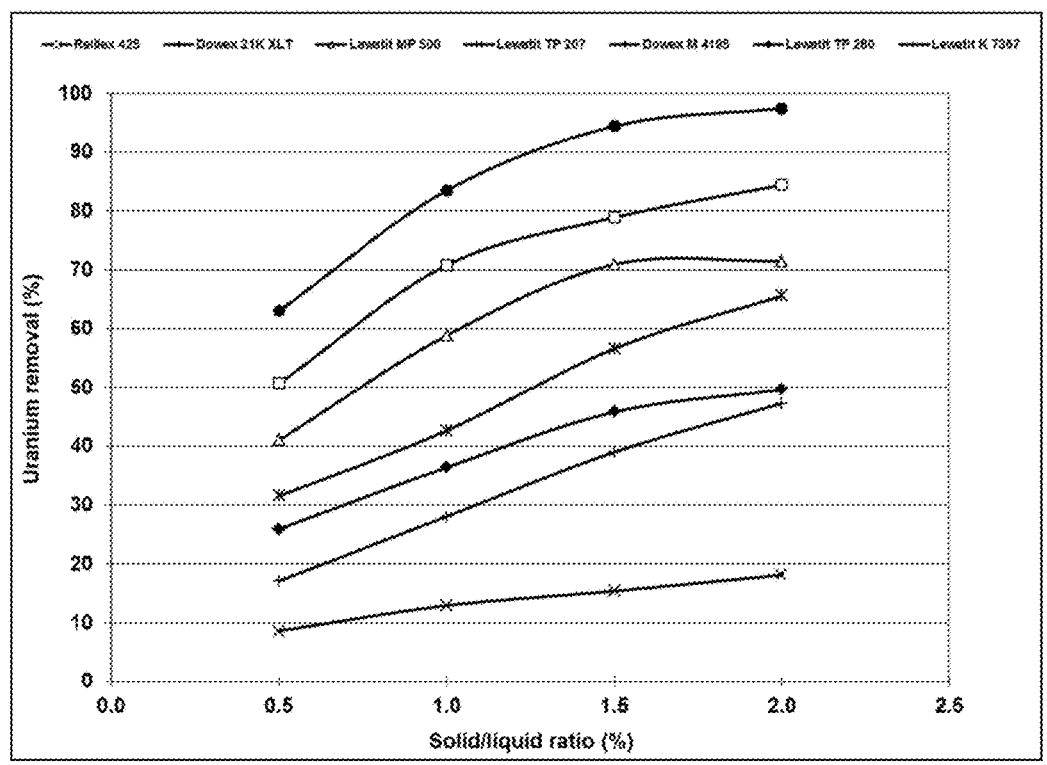
FIG. 6 is a diagram showing the U recovery from metals-rich solution of sulfuric acid and potassium iodide

Ion exchange experiments were performed in batch mode and then in column mode to recover U from sulfuric leachate in iodide media. Several ion exchange resins were studied including strong anionic resins (Dowex 21K XLT, Lewatit K7367 and Lewatit MP500), chelating resins (Dowex M4195, Lewatit TP207 and Lewatit TP260), and weak anionic resin (Reillex 425). FIG. 6 presents the U recovery by theses resins in batch mode. For this purpose, mass of 0.5 g to 2 g of dry resin was added to 100 mL of sulfuric leachate in 50 g/L iodide media with an initial U concentration of 40 ppm. Agitation was performed using an orbital shaker at 100 rpm during 24 h to ensure absorption equilibrium is reached. FIG. 6 is a comparison of ion exchange resin for U recovery from the leaching using sulfuric acid and potassium iodide and shows that U recovery from 50 g/L potassium iodide leachate using the chelating resin Lewatit TP260 is the most efficient. Uranium recovery yield reached 97% with a solid liquid ratio of 2%.

Figure 7:
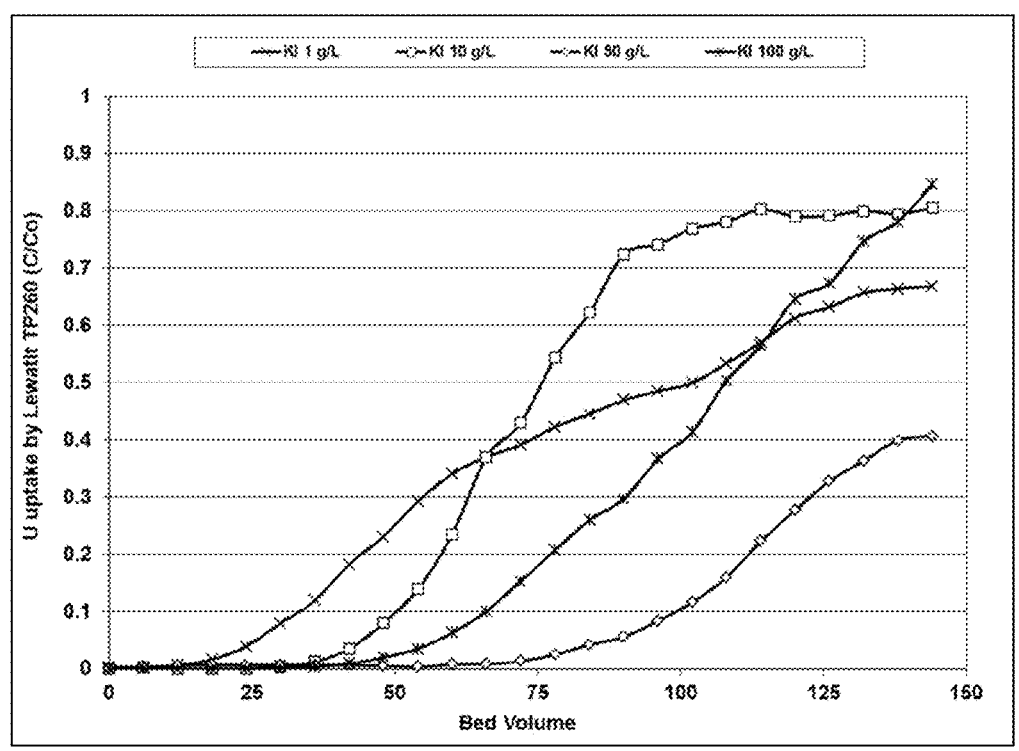
FIG. 7 is a diagram showing the U recovery from metals-rich solution at different iodide concentration.

The Lewatit TP260 resin was selected to perform several additional ion exchange tests with sulfuric acid in potassium iodide media leachates obtained in previous leaching experiments. In column experiments were conducted with an Omnifit column with a bed volume of 12 mL filled with the Lewatit TP260. Leachate was passed through the resin using a peristaltic pump (Masterflex) at a flowrate of 3 BV/h (0.6 mL/min) for a retention time of about 20 min. A fraction collector was used to split the column effluent in 24 sequential fractions. Several tests were done using different iodide concentration from 1 g/L to 100 g/L. Initial U concentrations were about 40 ppm for 1, 10, and 50 g/L leachates and 80 ppm for 100 g/L leachate. The results are shown in FIG. 7. Uranium uptake is represented by the difference between initial and final concentration in the leachate ($C/C_0$). In such representations, the lower the curve is, the better the U uptake is. Uranium uptake by the resin seems to be improved by the presence of higher iodide concentration. Best breakthrough was obtained with the 50 g/L KI leachate. A good U uptake was also obtained with the 100 g/L KI leachate, which has the highest initial concentration. Resin capacity reached 6 mg/g and breakthrough was obtained at 60 BV.

EXAMPLE 5

Uranium Elution and Precipitation

Several experiments were done to produce yellow cake from the elution solutions. Ion exchange experiments for U recovery from sulfuric leachate with potassium iodide were conducted using the ion exchange resin Lewatit TP260. Uranium loaded in the Lewatit TP260 chelating resin was eluted using several stripping reagents. The experiments were done using 2M HCl, 6M NaOH and a mix of 1M $Na_2CO_3$ and $NH_4NO_3$ solutions.

Figure 8:
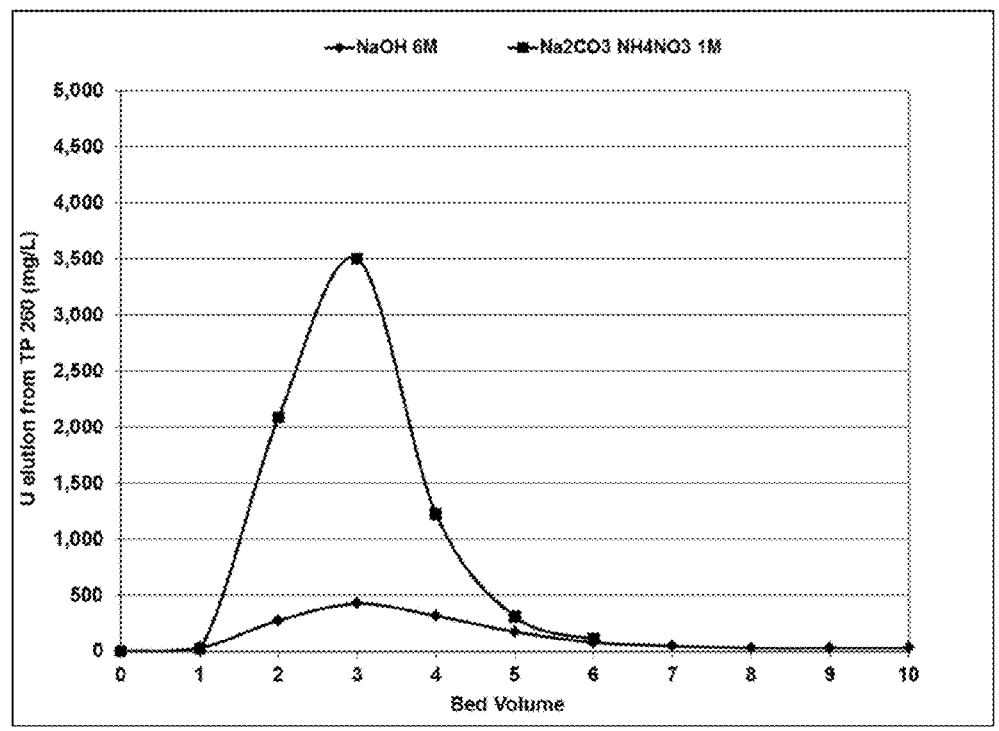
FIG. 8 is a diagram showing the U elution using sodium hydroxide or a mix of sodium carbonate and ammonium nitrate.

FIG. 8 presents the U elution curves obtained from the Omnifit column filled with Lewatit TP260 resin at 1.5 BV/h flowrate. The curve using HCl is not presented, as uranium was not significantly eluted from the resin. The mix of sodium carbonate and ammonium nitrate allows very good uranium stripping from the resin in 4 BV and produce an uranium-bearing solution suitable for further precipitation. The concentration factor obtained by U loading and stripping is about 15 (60 BV for loading/4 BV for stripping). Additional resin in pulp tests were done to recover uranium from the Lewatit TP 260 using 2M $HNO_3$, 1M NaCl, 2M NaOH, 1M $Na_2CO_3/NH_4NO_3$, 2M $NH_4OH$ and 1M $Na_2CO_3$ as stripping reagents. The best uranium stripping from the resin was obtained using 1M sodium carbonate which allows 99% of uranium recovery.

Figure 9:
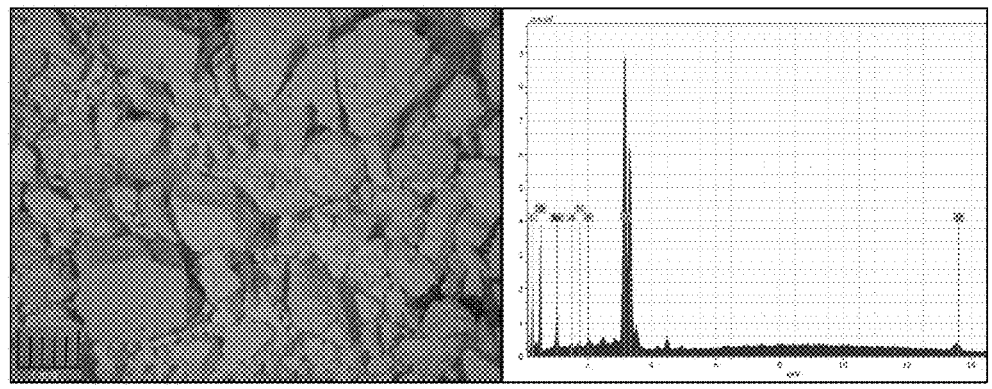
FIG. 9 is an optical microscope photograph and EDS spectrum of the uranium precipitate.

Uranium was then recovered as yellow cake using several precipitation reagents including ammonium hydroxide (ammonium diuranate), sodium hydroxide (sodium diuranate), magnesium oxide (uranium trioxide) and hydrogen peroxide (uranium peroxide). Several precipitation tests were done. Uranium was precipitated as sodium diuranate (SDU) using sodium hydroxide. Then the crude yellow cake was purified by precipitation using hydrogen peroxide (uranium peroxide) or ammonium hydroxide (ammonium diuranate) to obtain pure yellow cake. FIG. 9 presents an optical microscope photograph and the typical EDS spectrum of the SDU yellow cake from the U recovery in sulfuric and iodide media and precipitation using sodium hydroxide. The EDS spectra of the yellow cake indicates it is a Na—U—O compound with a high concentration of uranium and minor impurities of Si, P, and Al. The XRD pattern indicates the yellow cake is partially crystalline and identifies it as mainly a sodium uranium oxide.

EXAMPLE 6

Reuse of Washing Solutions for Subsequent Leaching

Figure 10:
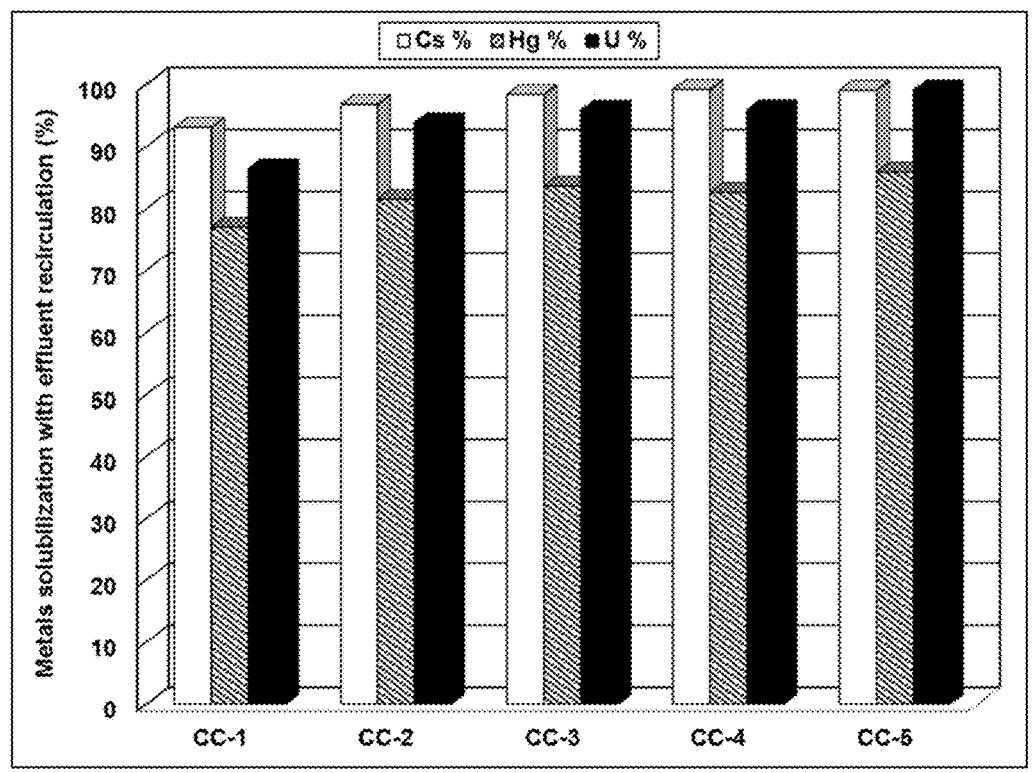
FIG. 10 is a diagram showing the Cs, Hg, and U solubilisation yields with counter current recirculation of washing solution

The U29 SRCW was subjected to several leaching using sulfuric acid and potassium iodide. The leaching steps were carried out by using washing solution instead of water. After the leaching steps, washing steps were done by using water. The leaching and washing steps were performed using a counter current recirculation of washing solution. The reuse of washing solution allows reducing the process costs and the volume of liquid waste produce. Five 150 g sample of SRCW crushed at 2 mm were mixed with 1500 mL of washing solution to obtain a 10% pulp density. Potassium iodide was also added to obtain a concentration of about 0.06M. Then pure sulfuric acid was added to obtain a concentration of about 1M. Agitation using an immersed impeller during 2 hours at ambient temperature was performed. After a filtration step, the leaching solution were treated to remove cesium and mercury, and then to recover the uranium. The treated-leaching solution is recycled and reused for the washing steps. FIG. 10 presents the solubilisation of Cs, Hg, and U from SRCW using sulfuric acid and potassium iodide (particle size=2 mm, t=120 min, $H_2SO_4$=1M, PD=10%, T=20° C., KI=0.06M). Initial concentration of Cs, Hg, and U of U29 SRCW are given in Table 1.

According to FIG. 10, solubilisation efficiencies increase for each elements during the five recirculation experiments. Improvement of solubilisation is due to the recycling of chemical reagents which concentration increase during counter-current recirculation. These results show that the washing solution can be reused in this process without affecting the leaching performance. The leaching solution can also be reused for washing steps after the recovery of metals by the separation step.

EXAMPLE 7

Rare Earth Leaching from Solid Radioactive Mine Wastes

Experiments on solid radioactive mine wastes (SRMW) were conducted using submerged tailings collected from the two uranium mines (Denison and Gunnar) and using an ore concentrate of rare earth (Quest). Table 2 shows the elements concentration in submerged tailings from uranium mines and the ore concentrate of rare earth. Theses SRMW were subjected to leaching using sulfuric acid and potassium iodide. A 100 g sample of SRMW was mixed with 1000 mL of distilled water to obtain a 10% pulp density. Agitation using an immersed impeller during 2 hours at ambient temperature was performed. Initial concentration of U, Th, and rare earth in each SRMW are given in Table 2.

Figure 11:
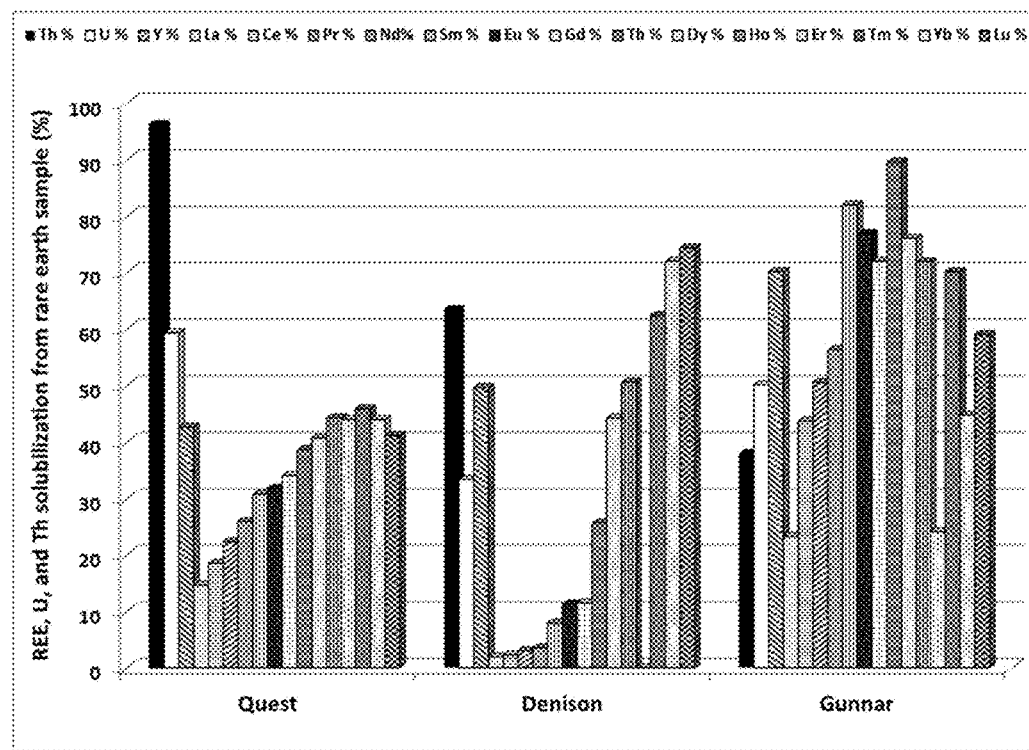
FIG. 11 is a diagram showing the U, Th and rare earth solubilisation yields from SRMW at low reagent concentration

In the first set of experiments, metals solubilisation from SRMW (Quest ore concentrate, Denison and Gunnar tailings) were done by using sulfuric acid and potassium iodide at low reagent concentration. Potassium iodide was added to obtain a concentration of about 0.06M. Then pure sulfuric acid was added to obtain a concentration of about 1M. FIG. 11 presents the U, Th, and rare earth solubilisation yields from SRMW (Quest ore concentrate, Denison and Gunnar tailings) using sulfuric acid and potassium iodide at low reagent concentration (t=120 min, $H_2SO_4$=1M, PD=10%, T=20° C., KI=0.06M).

Figure 12:
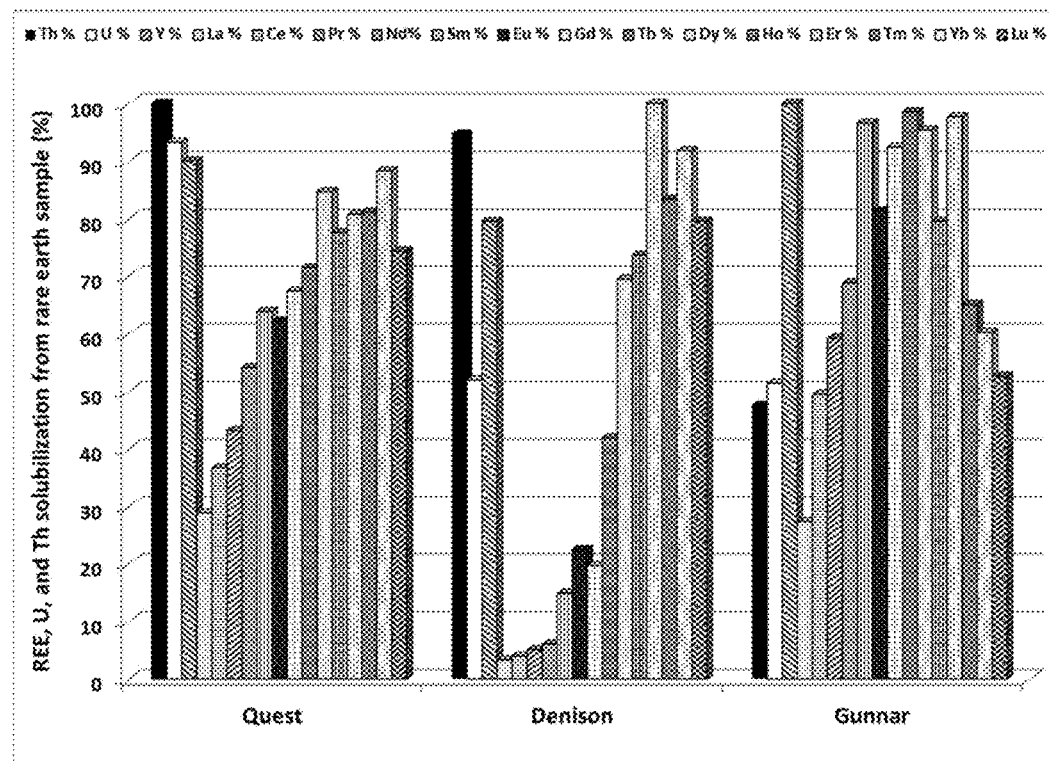
FIG. 12 is a diagram showing the U, Th and rare earth solubilisation yields from SRMW at high reagent concentration

In the second set of experiments, metals solubilisation from SRMW were done by using sulfuric acid and potassium iodide at high reagent concentration. Potassium iodide was added to obtain a concentration of about 0.6M. Then pure sulfuric acid was added to obtain a concentration of about 2M. Results of U, Th, and rare earth solubilisation yields from SRMW (t=120 min, $H_2SO_4$=2M, PD=10%, T=20° C., KI=0.6M) are presented in FIG. 12.

For the Quest ore concentrate, solubilisation yields at low reagent concentration reached 96% for Th, 59% for U, 20% for light rare earth and 40% for heavy rare earth. At high reagent concentration, solubilisation yields of 100% for Th, 93% for U, 41% for light rare earth and 76% for heavy rare earth were achieved. For the Denison tailings, solubilisation yields at low reagent concentration reached 63% for Th, 33% for U, 3% for light rare earth and 37% for heavy rare earth. At high reagent concentration, solubilisation yields of 95% for Th, 52% for U, 5% for light rare earth and 61% for heavy rare earth were achieved. For the Gunnar tailings, solubilisation yields at low reagent concentration reached 38% for Th, 50% for U, 43% for light rare earth and 67% for heavy rare earth. At high reagent concentration, solubilisation yields of 48% for Th, 51% for U, 51% for light rare earth and 84% for heavy rare earth were achieved. The process for metals leaching from solid radioactive wastes using sulfuric acid and potassium iodide is also efficient for U, Cs, and Hg recovery from radioactive cemented wastes as well as for U, Th, and rare earth recovery from radioactive mine wastes.

REFERENCES

Foust D. F. 1993. Extraction of mercury and mercury compounds from contaminated material and solutions. U.S. Pat. No. 5,226,545.

Habashi F., 2013. Extractive metallurgy of rare earths. Canadian Metallurical Quaterly, 52, 3.

Klasson T. K., Koran L. J. 1997. Removal of mercury from solids using the potassium iodide/iodine leaching process. Oak Ridge National Laboratory. Oak Ridge Tenn.

Kraus K. A. and Nelson F., 1956. "Anion exchange studies of the fission products". Proceedings of the First International Conference on the Peaceful Uses of Atomic Energy. Columbia University Press, New York, N.Y., USA. Vol. 7, pp 113-125.

Merritt R. C., 1971. The extractive metallurgy of uranium. Colorado School of Mines Research Institute. Johnson Publishing Company, Boulder, Co., U.S.A.

Obermoller H. R., White D. A. and Lagos S., 1991. "Resin adsorption of anionic chloride complexes for uranium isotope chemical exchange reactions". Hydrometallurgy, 27, 63 74.

Queneau P. B. and Berthold C. E., 1986. "Silica in hydrometallurgy: An overview". Can. Met. Q., 25(3), 201-209.

Ritcey G. M. and Wong E. W., 1985. "Influence of cations on crud formation in uranium circuits". Hydrometallurgy, 15(1), 55-61.

Wilkinson W. D., 1962. "Uranium Metallurgy, Volume I (Uranium Process Metallurgy)". John Wiley and Sons.

Zhang H., Jeffery C. A., Jeffrey M. I. 2012. Ion exchange recovery of gold from iodine-iodide solutions. Hydrometallurgy 125-126 (2012) 69-75.

Zhu Z., Pranolo Y., and Cheng C. Y. 2015. Separation of uranium and thorium from rare earth for rare earth production—A review. Minerals Engineering 77, 185-196.

The invention claimed is:

1. A process for recovering metals from cemented radioactive waste comprising the metals, the process comprising:
   a) a leaching step comprising contacting the cemented radioactive waste with an aqueous inorganic acid at a concentration between about 0.1 M and about 2 M, and a leaching salt, at a temperature lower than about 100° C., to solubilize at least a portion of the metals present in the cemented radioactive waste, thereby producing a mixture of a metal-rich leachate and a metal-poor waste; and
   b) a separation step comprising separating the metal-rich leachate from the metal-poor waste.

2. The process of claim 1, wherein the leaching salt is at a concentration between about 0.012 M and about 1.2 M.

3. The process of claim 1, wherein the metals comprise uranium, cesium, mercury, thorium, rare earth or combinations thereof.

4. The process of claim 1, wherein the cemented radioactive waste is crushed or screened prior to the leaching step.

5. The process of claim 4, wherein the cemented radioactive waste is crushed or screened to provide a particle size less than to about 1 cm.

6. The process of claim 4, wherein the cemented radioactive waste is crushed or screened to provide a particle size less than to about 2 mm.

7. The process of claim 1, wherein the cemented radioactive waste content is between about 50 g/L and about 500 g/L of the total mixture.

8. The process of claim 1, wherein the inorganic acid comprises sulfuric acid, nitric acid, hydrochloric acid, phosphoric acid, mixtures thereof or a combination of inorganic acid and salts thereof.

9. The process of claim 1, wherein the leaching salt comprises a halogen salt.

10. The process of claim 9, wherein the halogen salt comprises iodine, chlorine, fluorine, or bromine salt, or a combination thereof.

11. The process of claim 1, wherein the leaching salt is an iodine salt.

12. The process of claim 1, wherein the leaching salt is potassium iodide.

13. The process of claim 1, wherein the leaching step further comprises mixing for a period sufficient to solubilize the metals present in the cemented radioactive waste.

14. The process of claim 13, wherein the mixing is performed for about 0.5 h to about 24 h.

15. The process of claim 1, wherein the temperature is between about 20° C. and about 80° C.

16. The process of claim 1, comprising multiple leaching steps.

17. The process of claim 16, wherein the multiple leaching steps are performed sequentially.

18. The process of claim 16, wherein the multiple leaching steps comprise the same or different inorganic acids.

19. The process of claim 16, wherein the multiple leaching steps comprise the same or different concentrations of the inorganic acid.

20. The process of claim 16, wherein the multiple leaching steps comprise the same or different leaching salts.

21. The process of claim 16, wherein the multiple leaching steps comprise the same or different concentrations of the leaching salt.

22. The process of claim 16, wherein the multiple leaching steps are performed in batch or continuous mode in tank reactors.

23. The process of claim 1, wherein the separation step comprises decantation, filtration, centrifugation, solid-liquid separation, or a combination thereof.

24. The process of claim 1, further comprising a recovery step to recover at least one of the metals from the metal-rich leachate.

25. The process of claim 24, wherein at least a portion of the recovered metals comprises uranium, cesium, mercury, thorium, rare earth or a combination thereof.

26. The process of claim 24, wherein at least a portion of the recovered metals is recovered in the form of mixed metalloid compounds and/or as pure metal.

27. The process of claim 24, wherein at least two metals are simultaneously recovered.

28. The process of claim 24, wherein all metals are simultaneously recovered.

29. The process of claim 24, wherein the recovery step comprises chemical precipitation, ion exchange, solvent extraction or adsorption or a combination thereof.

30. The process of claim 24, wherein the recovery step provides a treated solution and the treated solution is recycled in a subsequent process for recovering metals from cemented radioactive waste.

31. The process of claim 1, further comprising a washing step of the separated metal-poor waste to remove residual metals.

32. The process of claim 31, wherein the washing step comprises:
  a) filtering the separated metal-poor waste to provide solids;
  b) rinsing or mixing the solids with a washing solution; and
  c) performing a solid-liquid separation to provide washed solids and spent washing waters.

33. The process of claim 32, wherein the washing solution comprises water, a dilute acid solution, or an acid solution.

34. The process of claim 32, comprising multiple washing steps.

35. The process of claim 34, wherein the multiple washing steps comprise the same or different washing solutions.

36. The process of claim 32, wherein the metal-rich leachate from the separation step and the spent washing waters from the washing step are combined prior to a recovery step.

37. The process of claim 32, wherein at least a portion of the spent washing waters is used in a subsequent process for recovering metals from cemented radioactive waste.

38. The process of claim 1, further comprising, prior to the leaching step:
  an attrition step comprising mixing the cemented radioactive waste with water to solubilize at least a portion of the metals present in the waste providing an aqueous mixture; and separating the aqueous mixture to provide a metal-rich liquid, a metal-depleted waste and a metal-rich sludge; and the metal-rich liquid and metal-rich sludge are used as the cemented radioactive waste in the leaching step.

39. The process of claim 38, wherein the attrition step is carried out for about 0.01 hour to about 1 hour.

40. The process of claim 38, comprising multiple attrition steps.

41. The process of claim 38, wherein separating the aqueous mixture comprises decantation, filtration, or centrifugation, or a combination thereof.

42. A process for recovering metals from cemented radioactive waste comprising the metals, wherein the metals comprise uranium, cesium, mercury, thorium, rare earth or combination thereof; the process comprising:
  a) an attrition step comprising mixing the cemented radioactive waste with water to solubilize at least a portion of the metals present in the waste providing an aqueous mixture; and separating the aqueous mixture to provide a metal-rich liquid, a metal-depleted waste and a metal-rich sludge;
  b) a leaching step comprising contacting the metal-rich sludge from step a) with an aqueous inorganic acid at a concentration between about 0.1 M and about 2 M, and a leaching salt, at a temperature lower than about 100° C., to solubilize at least a portion of the metals present in the cemented radioactive waste, thereby producing a mixture of a metal-rich leachate and a metal-poor waste; and separating the metal-rich leachate and metal-poor waste;
  c) a washing step comprising contacting the metal-poor waste from step b) with an aqueous solution, at a temperature lower than about 100° C., solubilize a substantial amount of the metals to produce a metal-rich solution and metal-poor waste, and separating the metal-rich solution and metal-poor waste;
  d) a combination step comprising combining the metal-rich liquid of step a), the metal-rich leachate of step b) and the metal-rich solution of step c) to provide a metal-rich combined solution;
  e) a recovery step comprising contacting the metal-rich combined solution with an ion exchange resin favoring the metals extraction; or contacting the metal-rich combined solution with a coagulant at a pH favoring precipitation of the metals.

43. The process of claim 42, wherein in step c), the aqueous solution is water or an inorganic acid and further comprises adding a leaching salt, the concentrations of the inorganic acid and the leaching salt being sufficient to solubilize at least a portion of the metals present in the metal-poor waste.

44. The process of claim 42, wherein at least a portion of the spent washing waters is used in a subsequent process for recovering metals from cemented radioactive waste as defined in claim 1.

* * * * *